(12) United States Patent
Shioda et al.

(10) Patent No.: US 7,701,587 B2
(45) Date of Patent: Apr. 20, 2010

(54) POSITION SENSING APPARATUS, AND POSITION SENSING METHOD

(75) Inventors: Michinori Shioda, Yokohama (JP); Toshihiko Ouchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 11/387,729

(22) Filed: Mar. 24, 2006

(65) Prior Publication Data
US 2006/0227340 A1 Oct. 12, 2006

(30) Foreign Application Priority Data
Mar. 30, 2005 (JP) ............................. 2005-098172

(51) Int. Cl.
G01B 9/02 (2006.01)
(52) U.S. Cl. ...................... 356/486; 356/498
(58) Field of Classification Search ................. 356/486, 356/498
See application file for complete search history.

(56) References Cited

U.S. PATENT DOCUMENTS

| | | | | |
|---|---|---|---|---|
| 5,293,213 A | * | 3/1994 | Klein et al. | 356/484 |
| 6,873,405 B2 | * | 3/2005 | Kido et al. | 356/121 |
| 7,054,339 B1 | * | 5/2006 | Hu et al. | 372/12 |
| 2006/0085159 A1 | | 4/2006 | Itsuji et al. | |
| 2006/0085160 A1 | | 4/2006 | Ouchi | |
| 2006/0188398 A1 | | 8/2006 | Yano et al. | |
| 2006/0197021 A1 | | 9/2006 | Ouchi | |
| 2006/0214176 A1 | | 9/2006 | Ouchi et al. | |
| 2006/0244629 A1 | | 11/2006 | Miyazaki et al. | |
| 2007/0030115 A1 | | 2/2007 | Itsuji et al. | |
| 2007/0195921 A1 | | 8/2007 | Ouchi | |
| 2007/0215808 A1 | | 9/2007 | Sekiguchi et al. | |
| 2007/0229094 A1 | | 10/2007 | Kasai et al. | |
| 2007/0235718 A1 | | 10/2007 | Kasai et al. | |
| 2007/0252604 A1 | | 11/2007 | Ouchi et al. | |

OTHER PUBLICATIONS

R.A. Cheville and D. Grischkowsky, Time domain terahertz impulse ranging studies, Appl. Phy. Lett. 67 (14), Oct. 2, 1996 Stillwater, Oklahoma.

U.S. Appl. No. 11/632,958, Filing Date: Jan. 19, 2007, Inventor: Toshiko Ouchi.

* cited by examiner

Primary Examiner—Hwa (Andrew) S Lee
(74) Attorney, Agent, or Firm—Fitzpatrick, Cella, Harper & Scinto

(57) ABSTRACT

An apparatus for sensing the position of an object includes an irradiation portion for irradiating the object with continuous electromagnetic radiation, a detection portion for detecting electromagnetic radiation reflected by the object, and an output portion for supplying a change in an amplitude intensity or a phase of the electromagnetic radiation based on information obtained by the detection portion. The position of the object is detected based on information supplied from the output portion.

8 Claims, 4 Drawing Sheets

POSITION SENSING APPARATUS, AND POSITION SENSING METHOD

BACKGROUND OF THE INVENTION

1. Field of the Invention

The present invention relates to an apparatus and method for sensing the position of an object by propagating electromagnetic radiation in a space, and particularly to an apparatus and method for sensing the position of an object by propagating terahertz (THz) electromagnetic radiation in a space.

2. Description of the Related Background Art

In this specification, the terminology "the terahertz (THz) electromagnetic radiation" or "terahertz (THz) radiation" or "terahertz (THz)" is used for radiation in a frequency range between about 30 GHz and about 30 THz. Conventionally, terahertz (THz) radiation pulses are used for position sensing using terahertz (THz) radiation, as disclosed in "Time domain terahertz impulse ranging studies (Applied Physics Letters, Vol. 67, p. 1960, 1995)". A femtosecond laser used for generation of the terahertz (THz) radiation pulses is, however, typically expensive and large in size.

Accordingly, a relatively low-cost position sensing apparatus is strongly desired.

SUMMARY OF THE INVENTION

It is an object of the present invention to provide an apparatus and method for sensing the position of an object without necessarily having to use a femtosecond laser.

According to one aspect of the present invention, there is provided an apparatus for sensing the position of an object, which includes an irradiation portion for irradiating the object with continuous electromagnetic radiation, a detection portion for detecting electromagnetic radiation reflected by the object, and an output portion for supplying a change in an amplitude intensity, or a phase of the electromagnetic radiation based on information obtained by the detection portion, and in which the position of the object is detected based on information supplied from the output portion. In the present invention, the change in the amplitude intensity of the reflected electromagnetic radiation can be handled equivalently to the change in the phase of the reflected electromagnetic radiation since the detection portion detects the electromagnetic radiation reflected by the object.

According to another aspect of the present invention, there is provided a method of sensing the position of an object, in which the above position sensing apparatus is used, and a time delay corresponding to the change in an amplitude intensity or a phase of the electromagnetic radiation is calculated by time-delaying the electromagnetic radiation by a time delaying system, so that the position of the object can be detected.

According to the present invention, it is possible to achieve position sensing without necessarily having to use a relatively high-cost femtosecond laser, thus providing a device and method for sensing the position of an object at relatively low cost.

These advantages, as well as others, will be more readily understood in connection with the following detailed description of the preferred embodiments and examples of the invention in connection with the drawings.

DETAILED DESCRIPTION OF THE PREFERRED EMBODIMENTS

Embodiments of the present invention will hereinafter be described with reference to the drawings.

Figure 1:
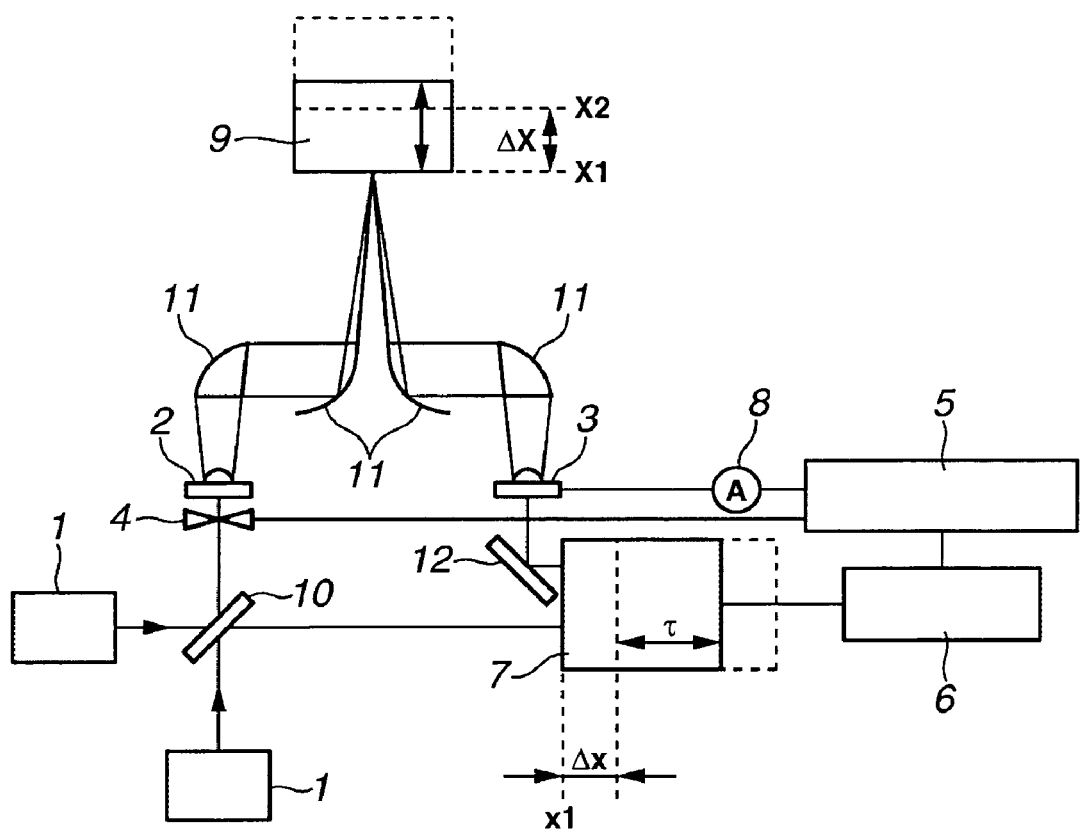
FIG. 1 is a schematic view illustrating the structure of an embodiment of the present invention.

FIG. 1 shows a first embodiment of the present invention. In the first embodiment, as illustrated in FIG. 1, laser light emitted from two tunable laser diodes 1 is mixed at a ratio of 50:50 using a beam splitter 10. Two mixture beams, each composed of two laser lights, are thus generated. A frequency of each of the thus-generated mixture beams is equal to a difference between frequencies of the two laser diodes 1. Frequencies of the laser diodes 1 are selected so that the difference frequency falls within a THz range. For example, wavelengths of the laser diodes 1 are changeable around 830 nm by about 10 nm.

One of the two mixture beams is converged onto a photoconductive device 2 for emitting electromagnetic radiation, while the other is converged onto a photoconductive device 3 for detecting electromagnetic radiation. With respect to the mixture beam converged on the photoconductive device 2, the beam is converged thereon through an optical chopper 4 for chopping the beam at a given chopping frequency. The optical chopper 4 is used to modulate the beam (pumping radiation) so that lock-in detection (described below) can be carried out. As for the mixture beam converged on the photoconductive device 3, the beam is converged thereon through a mirror 12 and a time delay is given thereto by a time delaying system 7.

As illustrated in FIG. 1, parabolic mirrors 11 are arranged so that THz radiation generated by the photoconductive device 2 can be directed to an object 9 and THz radiation reflected by the object 9 can be condensed on the photoconductive device 3 for detecting the electromagnetic radiation.

A current generated in the photoconductive device 3 by the reflected THz radiation is supplied to a lock-in amplifier 5 through a current amplifier 8. The current amplifier 8 is used to amplify a small signal detected by the photoconductive device 3 for detecting the electromagnetic radiation. The THz radiation is thus detected by a lock-in amplifiers 5, and a signal detected thereby is supplied to a computer 6. The computer 6 controls a movable stage of the time delaying system 7 based on the detected signal. Here, a chopping signal at the chopping frequency is also supplied to the lock-in amplifier 5 from the optical chopper 4.

Figure 2:
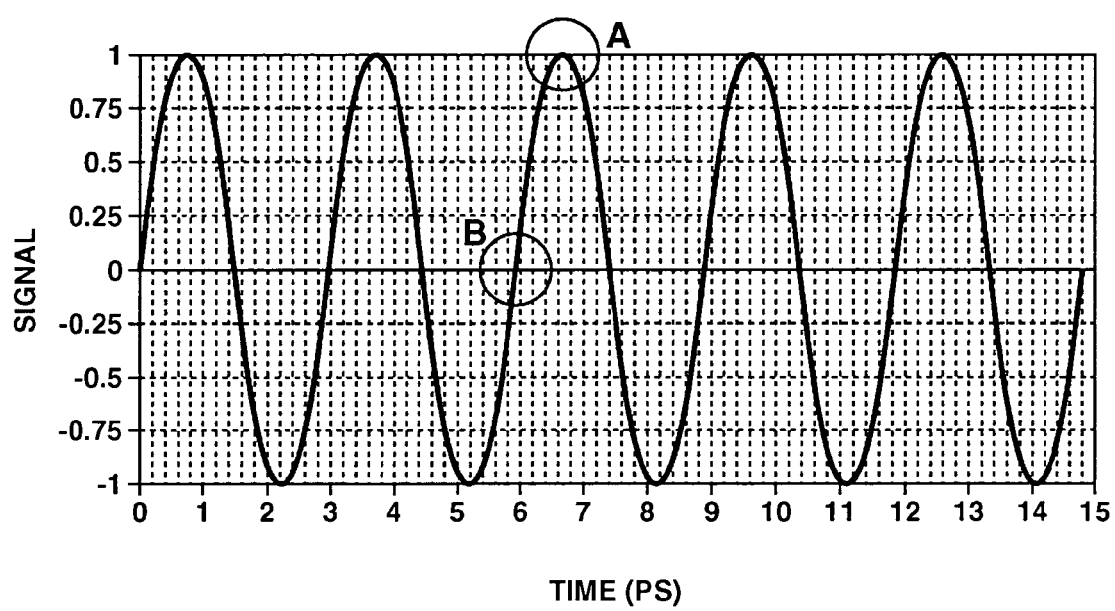
FIG. 2 is a view illustrating an example of a normalized signal of a signal detected by a lock-in amplifier.

FIG. 2 illustrates a normalized signal of the signal detected by the lock-in amplifier 5. The abscissa of FIG. 2 represents time or delay time. In the normalized signal, the detected signal is normalized so that a maximum of the signal is equal to one (1), a minimum of the signal is equal to minus one (−1), and a central value of the amplitude is equal to zero (0).

When such a signal as illustrated in FIG. 2 is obtained, it is assumed that the object 9 stays at a position X1, and the movable stage of the time delaying system 7 is controlled and reposed at a position x1 so that a maximum output (for example, a point A shown in FIG. 2) can be obtained from the lock-in amplifier 5.

Under the above condition, if the object 9 moves by a distance ΔX and reaches a position X2 in a small time Δt, the detected signal decreases. Accordingly, it is assumed that the computer 6 controls and moves the movable stage of the time delaying system 7 by Δx so that the maximum output can be obtained by the lock-in amplifier 5. Then, the amount Δx of movement of the movable stage provides a time delay τ corresponding to a change in the signal due to the movement of the object 9.

In a case where the movable stage of the time delaying system 7 has only a single round-trip optical path, the relationship between the time delay τ and the amount Δx of movement of the movable stage is given by $$\tau = 2\Delta x/c \ (c: \text{velocity of light})$$

The amount ΔX of movement of the object 9 is represented by $$\Delta X = 2\Delta x = \tau c$$

Where the movable stage of the, time delaying system 7 has n round-trip optical paths, the relationship between the time delay τ' and the amount Δx of movement of the movable stage is represented by $$\tau' = n\tau = 2n\Delta x/c \ (c: \text{velocity of light})$$

The amount ΔX of movement of the object 9 is written as $$\Delta X = 2n\Delta x = \tau' c$$

Upon calculation of the amount ΔX of movement of the object 9 by the computer 6 every small time Δt, the location of the object 9 can be detected every small time Δt. Since ΔX needs to be smaller than a wavelength of the graph in FIG. 2, a small time Δt is selected so that this condition can be satisfied. It should be noted that the abscissa of FIG. 2 represents the time delay, and it can be seen from FIG. 2 that one period of the graph is three (3) picoseconds, i.e., $3 \times 10^{-12}$ seconds. The velocity of the radiation (THz radiation) can be assumed to be equal to $3 \times 10^{11}$ mm/s, and hence the distance the radiation travels for three picoseconds is $3 \times 10^{-12}$ (s)$\times 3 \times 10^{11}$ (mm/s)=0.9 (mm) Thus, the wavelength of the graph in FIG. 2 is equal to 0.9 mm.

A second embodiment will now be described. In a sensing method of the second embodiment, the position of the object 9 is detected without controlling the movable stage of the time delaying system 7 every small time Δt.

In the second embodiment, when the movable stage of the time delaying system 7 moves a distance larger than the value corresponding to the wavelength of the signal illustrated in FIG. 2, the amount ΔX of movement of the movable stage is obtained by calculating the number of pulses of an output supplied from the lock-in amplifier 5. The structure of the second embodiment is substantially the same as that of the first embodiment illustrated in FIG. 1.

The second embodiment is different from the first embodiment in a method of detecting the position. In the first embodiment, the movable stage of the time delaying system 7 is controlled every small time Δt, and the amount ΔX of movement of the object 9 is obtained from the amount Δx of movement of the movable stage. By contrast, in the sensing method of the second embodiment, the one-to-one correspondence relationship is established beforehand between the amount ΔX of movement of the movable stage and the output from the lock-in amplifier 5. This relationship is stored in the computer 6 as a data base. The position of the object 9 is acquired by comparison of the output of the lock-in amplifier 5 with the data base.

It is assumed that the object 9 stays at a position X1 and the output of the lock-in amplifier 5 is obtained as illustrated in FIG. 2. The ordinate of FIG. 2 represents the signal detected by the lock-in amplifier 5, which is normalized so that its maximum is one, its minimum is minus one, and the central value of the amplitude is zero.

Figure 3:
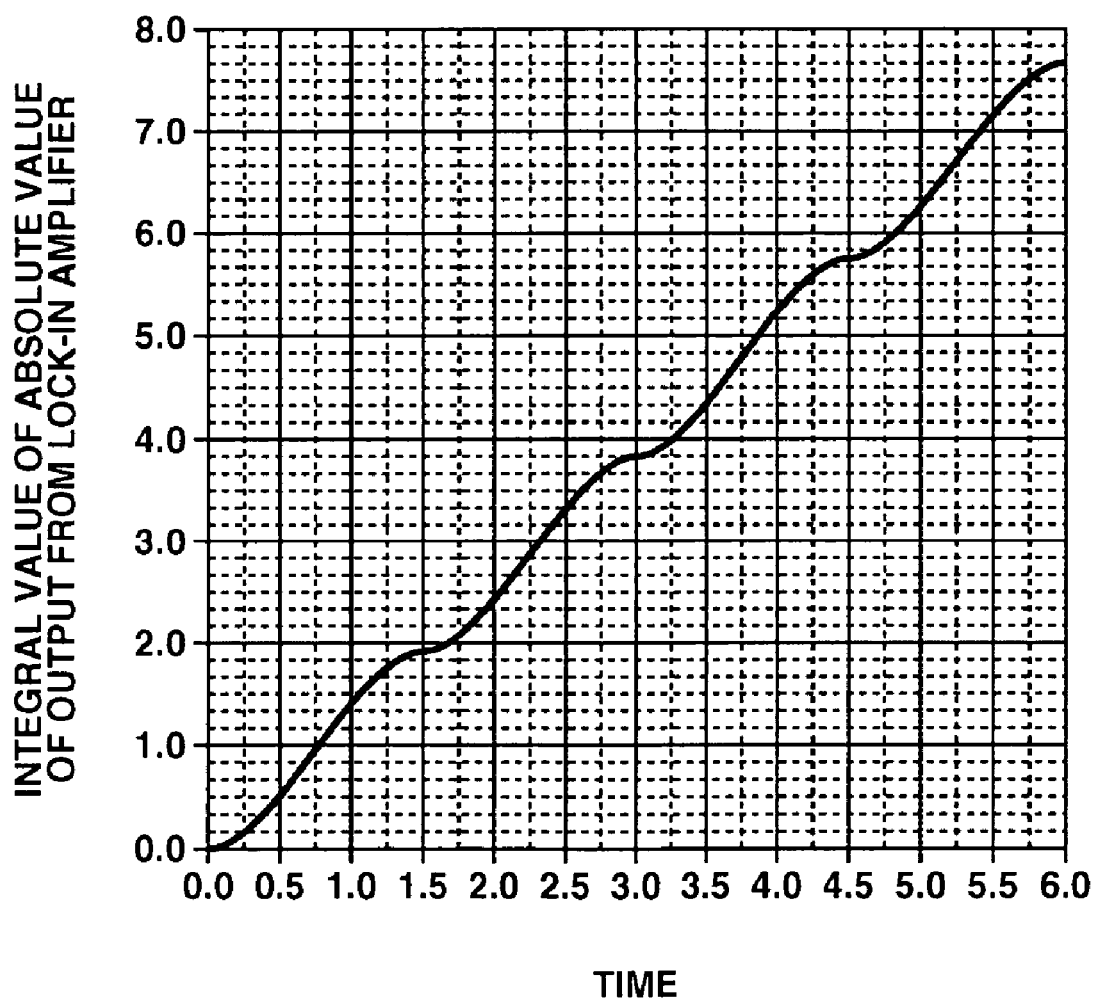
FIG. 3 is a view illustrating plotted integral values of absolute values of outputs from the lock-in amplifier.

Under such a condition the movable stage of the time delaying system 7 is moved to equalize the output of the lock-in amplifier 5 with zero (0) (for example, a point B in FIG. 2). The position of the movable stage at this moment is assumed to be x1. Here, the movable stage is moved in a direction, and an integral value of absolute values of outputs from the lock-in amplifier 5 during this movement is recorded. Thus, the one-to-one correspondence relationship between the time delay and the output from the lock-in amplifier 5 can be established, as illustrated in FIG. 3 in which the abscissa indicates the time delay. Since a proportional relationship exists between the delay time and the amount Δx of movement of the movable stage, FIG. 3 shows that the one-to-one correspondence relationship is established between the amount Δx of movement of the movable stage and the output from the lock-in amplifier 5. The ordinate in FIG. 3 can be coordinates-transformed according to necessity.

Under a condition that the relationship between the amount Δx of movement of the movable stage and the integral value of absolute values of outputs from the lock-in amplifier 5 is stored beforehand in the computer 6 as the database, the computer 6 can calculate the integral value of absolute values of outputs from the lock-in amplifier 5, which varies as the object 9 moves. The amplifier can also acquire the amount Δx of movement of the movable stage by comparison of the thus-calculated integral value with the stored data base. When the amount Δx of movement of the movable stage is known, the amount Δx of movement of the object 9 can be obtained from the following relationship.

Where the movable stage of the time delaying system 7 has only a single round-trip optical path, the amount ΔX of movement of the object 9 can be obtained from ΔX=2Δx. Where the movable stage of the time delaying system 7 has n round-trip optical paths, the amount ΔX of movement of the object 9 can be obtained from ΔX=2nΔx.

The amount ΔX of movement of the object 9 can be thus obtained based on a change in the output from the lock-in amplifier 5 due to the movement of the object 6. In the second embodiment there is typically no need to make the amount ΔX of movement of the object 9 smaller than the value corresponding to the wavelength of the curve in FIG. 2.

Figure 4:
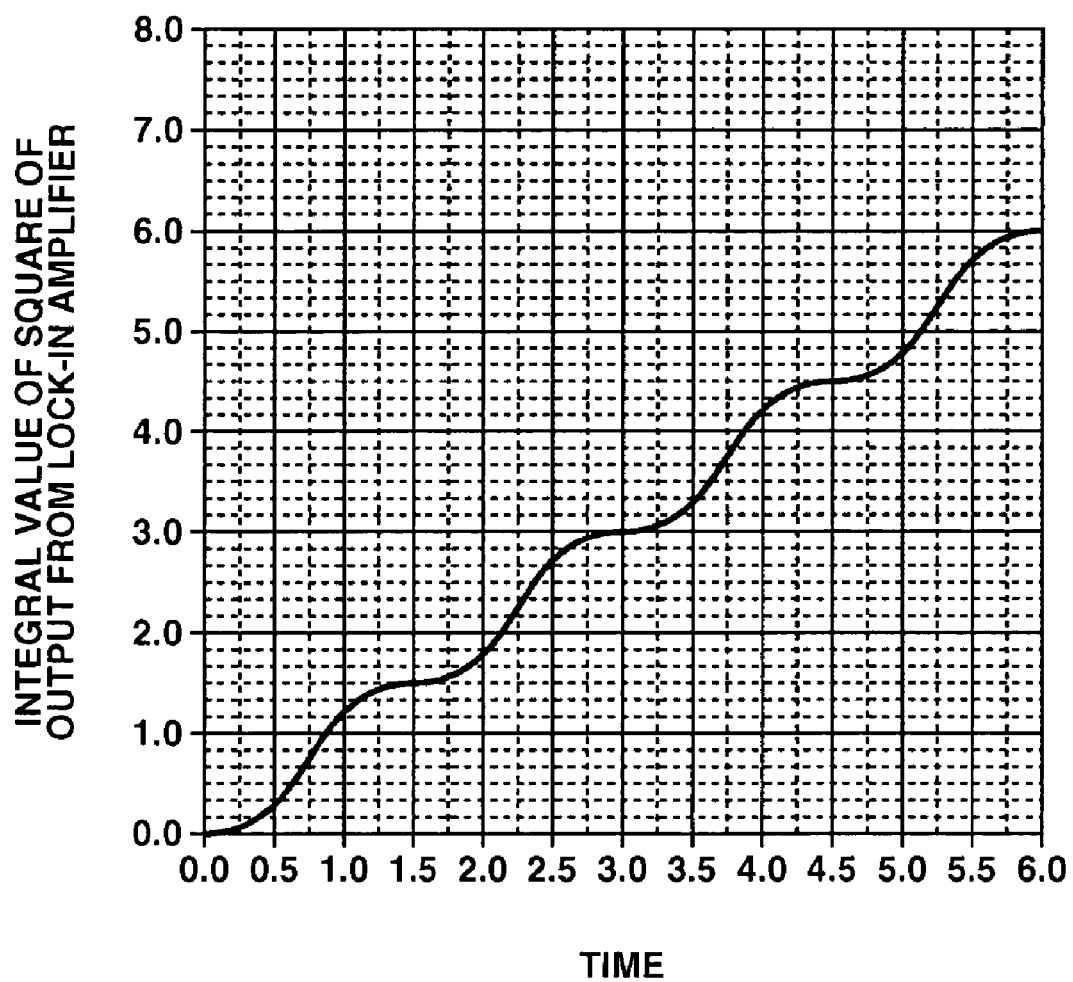
FIG. 4 is a view illustrating plotted integral values of squares of outputs from the lock-in amplifier.

In the second embodiment, the integral value of absolute values of outputs from the lock-in amplifier 5 is used to obtain the one-to-one correspondence relationship between the amount Δx of movement of the movable stage and the output from the lock-in amplifier 5. It is, however, possible to use an integral value of squares of outputs from the lock-in amplifier 5 instead of the integral value of absolute values of outputs from the lock-in amplifier 5. FIG. 4 shows plotted integral values of squares of outputs from the lock-in amplifier 5. The ordinate in FIG. 4 can be coordinates-transformed according to necessity.

According to the present invention, it is possible to achieve position sensing by means of generation of continuous electromagnetic radiation that is obtained by using two relatively-low-cost and small-sized laser diodes without using a relatively-high-cost femtosecond laser, for example. It is hence possible to provide an inexpensive small-sized apparatus and method for sensing the position of an object.

While the present invention has been described with respect to what is presently considered to be the preferred embodiments and examples, it is to be understood that the invention is not so limited. The present invention is intended to cover various modifications and equivalent arrangements included within the spirit and the scope of the appended claims.

This application claims priority from Japanese Patent Application No. 2005-98172, filed Mar. 30, 2005, which is hereby incorporated by reference.

What is claimed is:

1. An apparatus for obtaining an amount of movement of an object, said apparatus comprising:

two laser diodes for emitting laser lights;

a beam splitter for mixing laser lights emitted from the two laser diodes to generate at least two mixture beams including a first mixture beam and a second mixture beam;

a photoconductive device for emitting a terahertz electromagnetic wave when irradiated by the first mixture beam;

parabolic mirrors for directing the emitted terahertz electromagnetic wave towards the object, wherein the terahertz electromagnetic wave is reflected by the object;

a photoconductive device for detecting the reflected terahertz electromagnetic wave when irradiated by the second mixture beam; and a time delaying system including a movable stage for time-delaying the second mixture beam, wherein the movable stage is controlled based on the detected terahertz electromagnetic wave, wherein when the object is in a first position, a first output in the reflected terahertz electromagnetic wave detected by the photoconductive device for detecting the reflected terahertz electromagnetic wave is obtained, wherein when the object moves from the first position to a second position, a second output in the reflected terahertz electromagnetic wave detected by the photoconductive device for detecting the reflected terahertz electromagnetic wave is obtained, wherein when the object is in the second position, the movable stage of the time delaying system is moved such that an output in the reflected terahertz electromagnetic wave detected by the photoconductive device for detecting the reflected terahertz electromagnetic wave changes from the second output to the first output, and wherein the amount of movement of the object is calculated from an amount of the movement of the movable stage.

2. the apparatus according to claim 1, wherein the terahertz electromagnetic wave emitted by irradiating the photoconductive device for emission with the first mixture beam is a continuous wave.

3. The apparatus according to claim 1, wherein a frequency of the mixture beams is a difference between frequencies of the laser lights, and the frequency of the mixture beams is in a range between 30 GHz and 30 THz.

4. The apparatus according to claim 1, wherein the time delaying system is provided in an optical path for irradiating the photoconductive device for detection with the second mixture beam.

5. An apparatus for obtaining an amount of movement of an object said apparatus comprising:

two laser units for emitting laser lights a beam mixture unit for mixing the laser lights emitted from the two laser units to generate at least two mixture beams including a first mixture beam and a second mixture beam, the mixture beams having a frequency equal to a difference between frequencies of the laser lights;

an emitting unit for emitting a terahertz electromagnetic wave by using the first mixture beam, wherein the emitted terahertz electromagnetic wave is towards the object and reflected by the object;

a detecting unit for detecting the reflected terahertz electromagnetic wave by using the second mixture beam; and a time delaying system including a movable stage for time-delaying the second mixture beam;

wherein when the object is in a first position, a first output in the reflected terahertz electromagnetic wave detected by the detecting unit is obtained, wherein when the object moves from the first position to a second position, a second output in the reflected terahertz electromagnetic wave detected by the detecting unit is obtained, wherein when the object is in the second position, the movable stage of the time delaying system is moved such that an output in the reflected terahertz electromagnetic wave detected by the detecting unit changes from the second output to the first output, and wherein the amount of movement of the object is calculated from an amount of the movement of the movable stage.

6. The apparatus according to claim 5, wherein the information relating to movement stored in the computer is a relationship between the detected terahertz electromagnetic wave and a time delay corresponding to an amount of movement of the moveable stage.

7. The apparatus according to claim 5, wherein the amount of movement of the object is obtained by using an integral value of absolute values or squares of an amplitude of the terahertz electromagnetic wave stored in the computer.

8. The apparatus according to claim 1, wherein the laser diodes can change wavelengths of emitted laser lights.

* * * * *